J. B. ALEXANDER.
SHOCK LOADER.
APPLICATION FILED JAN. 29, 1907.
934,646.
Patented Sept. 21, 1909.
2 SHEETS—SHEET 1.
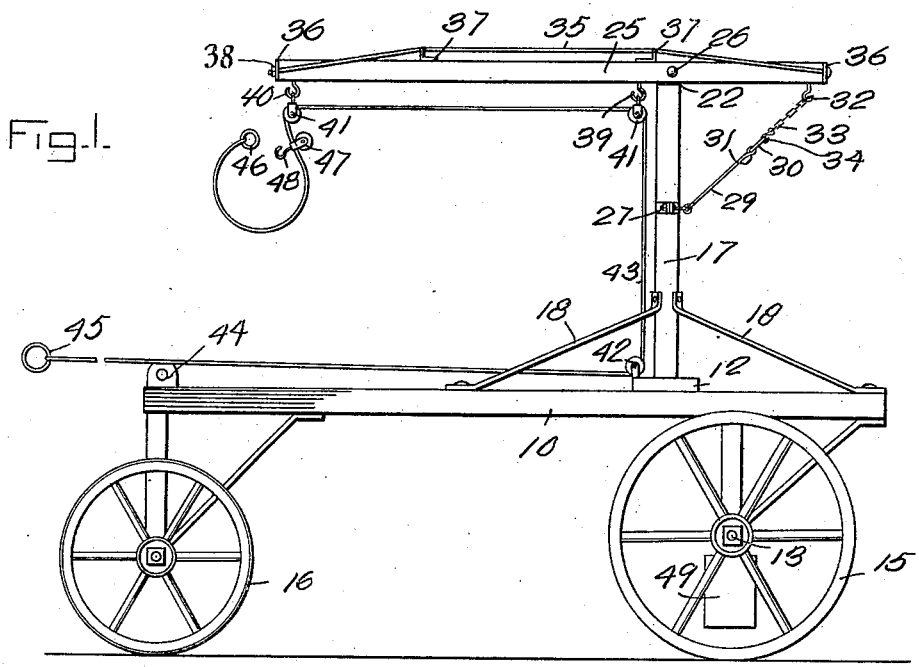
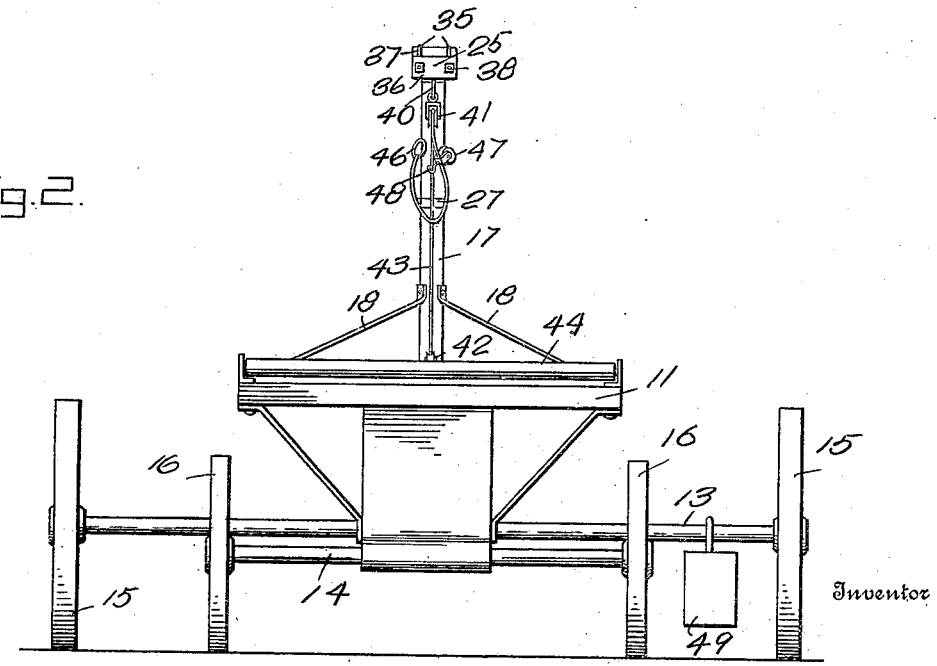
Witnesses
G. R. Thomas
F. G. Smith
Inventor
J. B. Alexander
By
Attorneys J. B. ALEXANDER.
SHOCK LOADER.
APPLICATION FILED JAN. 29, 1907.
934,646.
Patented Sept. 21, 1909.
2 SHEETS—SHEET 2.
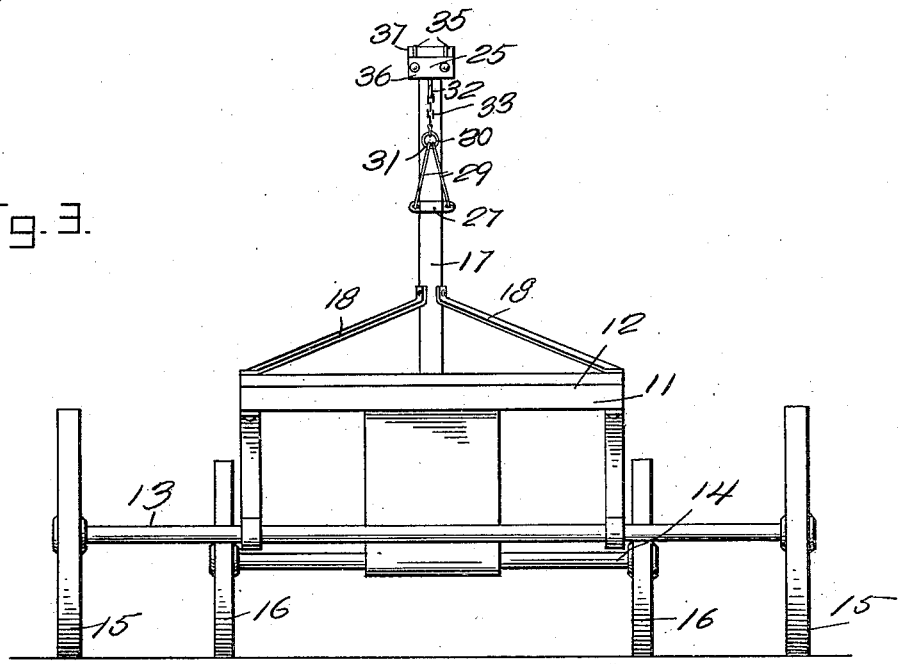
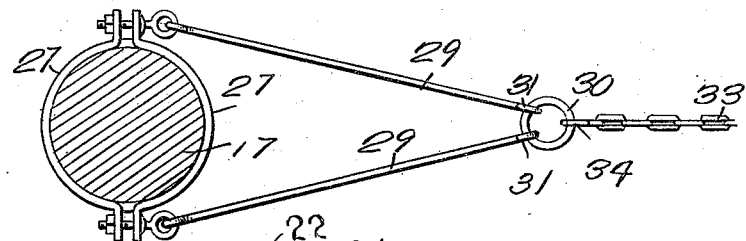
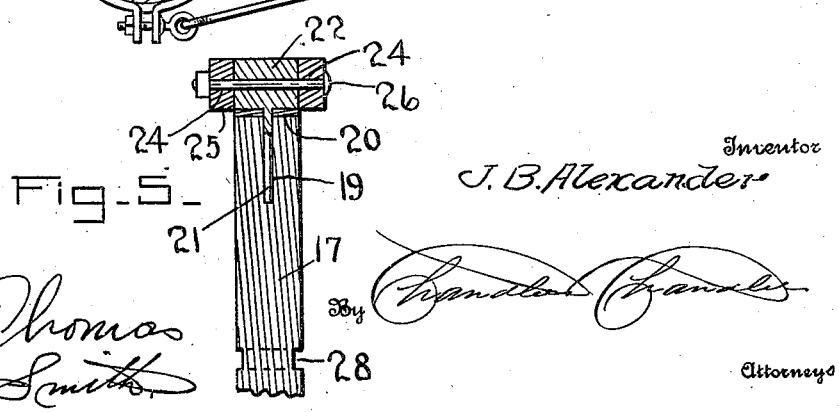

UNITED STATES PATENT OFFICE.

JOHN B. ALEXANDER, OF ANSONIA, OHIO.

SHOCK-LOADER.

934,646.

Specification of Letters Patent. Patented Sept. 21, 1909.

Application filed January 29, 1907. Serial No. 354,650.

*To all whom it may concern:*

Be it known that I, JOHN B. ALEXANDER, a citizen of the United States, residing at Ansonia, in the county of Darke, State of Ohio, have invented certain new and useful Improvements in Shock-Loaders; and I do hereby declare the following to be a full, clear, and exact description of the invention, such as will enable others skilled in the art to which it appertains to make and use the same.

This invention relates to shock loaders and has for its object to provide a novel and efficient mechanism for loading shocks from their position upon the ground into a wagon.

In the accompanying drawings, Figure 1 is a view in side elevation of a loading mechanism constructed in accordance with my invention. Fig. 2 is a front end view thereof. Fig. 3 is a rear end view. Fig. 4 is a detail horizontal sectional view through the post or upright taken directly beneath the boom. Fig. 5 is a detail vertical sectional view through the post or upright, and taken in a plane transversely of the frame.

Referring more specifically to the drawings, the frame is shown as comprising side sills 10, end sills 11, and a cross piece 12, which extends from one to the other of said side sills adjacent the rear end of the frame, but slightly in advance of the rear axle, which is indicated by the numeral 13, and is of considerably greater length than the front axle 14. Mounted respectively upon its rear and front axles are wheels 15 and 16 which serve to support the frame for travel.

Mounted vertically upon the cross piece 12 is an upright 17, which is securely held in position by means of braces 18, and in the upper end of this upright is formed a bore 19. A washer or wear plate 20 is secured upon the upper end of the upright, and is provided with an opening through which and into the bore 19, projects a pin 21 carried by a head 22, which head is adapted by this means to have a turning movement upon the said upper end of the upright. Through this head is formed transversely an opening 23, and through the opening and corresponding openings 24 formed through a boom 25, is engaged a pin 26, the head 22 being of course received in a recess in the said boom. It will thus be understood that the boom may have a horizontal swinging movement as also a vertical swinging movement, and in order to hold the beam at various adjustments in its vertical swinging movement, I have provided a two-part band or collar 27, which is bolted around the upright 17 and in a groove 28, formed therein, and at corresponding points upon the collar sections are pivoted the corresponding ends of rods 29. At their opposite ends the rods 29 are connected by means of a ring 30, which is engaged through eyes 31 formed at the said ends of the rods. The pivotal point for the boom 25 is located nearer the rear end thereof than the forward end, and a hook 32 is carried by the boom at its rear end and has interchangeable engagement with the links of a chain 33, the said chain being provided at one of its ends with a hook 34 which is connected with the ring 30.

In order to brace the boom and relieve it somewhat of the strain caused by the weight of a shock when being lifted, I have provided a pair of brace rods 35 which are engaged at their ends through eyes formed in plates 36 which are secured to the ends of the boom, and these rods are engaged over plates 37 secured upon the upper face of the boom, and have their ends threaded for the engagement thereon of nuts 38 which may be turned to tighten the brace rods.

The boom 25 carries adjacent the upright 17 a hook 39, and adjacent its forward end a hook 40, and suspended from each of these hooks is a block or pulley 41. A similar block or pulley 42 is connected with the forward edge of the cross piece 12 directly in front of the upright 17, and engaged with all of these pulleys or blocks is a cable 43, which has its lower stretch extended over a roller 44, journaled at the forward end of the frame and provided at its extreme end with a ring 45, for the attachment of a swingletree or other draft element. A similar ring 46 is carried by the cable at its opposite end, and upon the cable and below the forward pulley 41, is disposed a traveling pulley or block 47, provided with a hook 48, which is engageable with the ring 46, it being understood that when so engaged, after the cable has been passed around a shock, the weight of the shock will cause the block or pulley 47 to travel upon the cable, and securely bind the cable around the shock. A weight 49 is secured upon the axle 13 adjacent one of the wheels 15, and at that end of the axle opposite to the end over which the boom swings when loading the shocks, it being understood that this weight serves respectively to prevent tilting of the frame.

What is claimed is:

In a device of the class described, an upright formed at its upper end with a socket, a head formed upon its under side with a stud, said stud being received in said socket, a wear plate interposed between the head and the upper end of the upright, a boom formed adjacent one end with a slot in which the head is received, a pivot pin engaged through the boom from side to side and through the head, a cylindrical portion formed on said upright intermediate its ends, a collar revolubly mounted on said lindrical portion, a hook carried on one e of said boom, a chain connected at one e to said collar and adapted to have one of links engaged by said hook, and a hoisti cable suspended from the other end of 1 boom.

In testimony whereof, I affix my signatu in presence of two witnesses.

JOHN B. ALEXANDER.

Witnesses:
JOHN FENTERS,
F. L. ZILER.